United States Patent
Zhang

(10) Patent No.: US 8,259,793 B2
(45) Date of Patent: Sep. 4, 2012

(54) SYSTEM AND METHOD OF FAST MPEG-4/AVC QUANTIZATION

(75) Inventor: Ximin Zhang, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1569 days.

(21) Appl. No.: 11/688,130

(22) Filed: Mar. 19, 2007

(65) Prior Publication Data

US 2008/0232465 A1    Sep. 25, 2008

(51) Int. Cl.
*H04N 7/12* (2006.01)
(52) U.S. Cl. ............... 375/240.03; 375/240.02
(58) Field of Classification Search ........... 375/240.03, 375/240.02
See application file for complete search history.

(56) References Cited

U.S. PATENT DOCUMENTS

| | | | |
|---|---|---|---|
| 6,222,881 B1 * | 4/2001 | Walker | 375/240.03 |
| 6,771,703 B1 | 8/2004 | Oguz et al. | |
| 7,817,864 B2 * | 10/2010 | Chiba et al. | 382/232 |
| 2003/0081850 A1 * | 5/2003 | Karczewicz et al. | 382/247 |
| 2003/0185300 A1 * | 10/2003 | Hagiwara | 375/240.03 |
| 2005/0047504 A1 * | 3/2005 | Sung et al. | 375/240.2 |
| 2005/0069211 A1 * | 3/2005 | Lee et al. | 382/239 |
| 2005/0129122 A1 * | 6/2005 | Booth et al. | 375/240.16 |
| 2005/0243917 A1 * | 11/2005 | Lee | 375/240.03 |

FOREIGN PATENT DOCUMENTS

| | | |
|---|---|---|
| EP | 1549074 A1 | 6/2005 |
| WO | 2005084035 A2 | 9/2005 |

OTHER PUBLICATIONS

Sullivan et al, The H.264/AVC Advance Video Coding Standard: Overview and Introduction to the Fidelity Range Extensions, Aug. 2004.*
H264_cavlc_wp, White Paper: H.264/AVC (CAVLC), 2002.*
H264_cabac_wp, Whtie Pater: H.264/AVC (CABAC), 2002.*
H.264 Standard, Advanced Video coding for generic audiovisual services, Nov. 2007.*

* cited by examiner

*Primary Examiner* — Jung Kim
*Assistant Examiner* — Shan Elahi
(74) *Attorney, Agent, or Firm* — John P. O'Banion

(57) ABSTRACT

A system and method for coding moving pictures according to MPEG-4/AVC is described which performs rapid quantization of the transformed residue signal is described. The system and method may employ a number of techniques, which may be considered separately or in combination, including: extreme macroblock (MB) analysis, pre-execution table generation, conditional skipping, and picture level scaling. For example, MBs are detected wherein the quantization scale is adapted prior to quantization processing. The quantization process can be skipped for DCT coefficients which do not meet a threshold criterion. Weighted quantization can be readily performed in response to generating sets of scaled quantization tables in the beginning of encoding each picture, wherein the quantization scale of the DCT coefficients need not be scaled in response to position.

42 Claims, 3 Drawing Sheets

THR_CABAC_SATD[12] =

{10000, 10000, 14000, 15000, 16000, 20000, ...

24000, 27000, 30000, 33000, 36000, 40000};

THR_CABAC_SAD[12] =

{5000, 5000, 7000, 7000, 9000, 11000, ...

13000, 15000, 17000, 19000, 21000, 23000};

THR_CAVLC_SATD[12] =

{6000, 6000, 7500, 10000, 12000, 15000, ...

15000, 15000, 18000, 21000, 24000, 27000};

THR_CAVLC_SAD[12] =

SYSTEM AND METHOD OF FAST MPEG-4/AVC QUANTIZATION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to MPEG-4/AVC video coding, and more particularly to reducing computational complexity of the quantization that is carried out in MPEG-4/AVC video coding.

2. Description of Related Art

MPEG-2 is currently the most widely used standard employed in compressing audio and visual (AV) digital data. At the same time, MPEG-4 is an emerging standard that typically provides a factor of two improvement in coding efficiency over MPEG-2. MPEG-4 is also variously known as MPEG-4 Part 10, JVT (for Joint Video Team), H.264, H.26L, or just AVC (for Advanced Video Coding). Although MPEG-4 provides a considerable coding gain, processing complexity, and associated computational overhead, are considerably increased.

An MPEG-4 encoder first applies the Discrete Cosine Transform (DCT) to the 4×4 or 8×8 block of the residue signal and then quantizes the DCT coefficients. In the MPEG-4 standard, each DCT coefficient has to be quantized using a quantization table and scaled with a value, which is stored in a scaling table at a position corresponding to the DCT coefficient. The scaling is computationally expensive due to the need for a division operation. The picture level quantization table scaling method pre-computes a new scaled quantization table using the quantization table and the scaling table, whereafter it transmits the new scaled quantization table to the quantization process.

In the MPEG-4 standard, the number of bits in MB_layer data for any given macroblock (MB) should not exceed a threshold specified in the AVC standard. If during an encoding process, the number of bits used by a MB exceeds the threshold, the MB must be re-encoded. To obtain an optimal result, multi-pass operation may be required which is computationally expensive.

To reduce processing complexity, researchers have primarily focused on the areas of fast motion estimation and fast mode decision. However, when fast motion estimation and mode decision algorithms are utilized, the complexity of quantization of the DCT coefficients becomes an important consideration.

In the AVC standard, a total of fifty-two values of Qstep are supported and indexed by a quantization parameter (QP). The Qstep increases by 12.5% for each increment of one in QP. The wide range of quantizer step sizes makes it possible for an encoder to accurately and flexibly control the trade-off between bit rate and quality. However, the implementation complexity is relatively high by the requirements of multiplication and shifting and incorporating the post-scaling and pre-scaling. In the standard, the following equation is used to quantize and scale a single coefficient by:

$$Z_{ij} = \text{round}\left(\frac{C_{ij} \cdot W(MF[qp\ \%6][i][j]) + f}{2^{quant\_shift}}\right) \quad (1)$$

where the scaling process can be conducted as following, $$W(MF[qp\ \%6][i][j]) = \text{round}\left(\frac{16 \cdot MF[qp\ \%6][i][j]}{Scale[i][j]}\right) \quad (2)$$

and wherein MF is a multiplication factor table which will return different values based on the value of qp and position i and j, qp is quantization parameter, and f is quantization offset. That is equivalent to two multiplications, one division, one summation, one shifting and two table look-up operations for every single coefficient. Also, one condition checking operation and two other summations are required to obtain the number of zero coefficients and put signs on the quantized coefficients.

In the AVC standard, bitstreams conforming to any profile at a specified level should obey some constraints. Among them, one constraint is invariant to the profile and level, which is the maximum bits allowed in the macroblock layer data for any macroblock. This constraint is specified in Annex A3.1(n) in the AVC standard document. According to the standard in Annex A3.1(n), the number of bits of macroblock_layer( ) data for any macroblock does not exceed 3200. During the encoding process, if the number of bits used by a macroblock exceeds this threshold, then this macroblock needs to be re-encoded by using some adjustments, wherein the constraint is conformed. To obtain an optimal result, multi-pass encoding may be required. However, the complexity of such a multi-pass strategy typically renders doing so impractical.

BRIEF SUMMARY OF THE INVENTION

Accordingly, the present invention is a method of performing rapid quantization of DCT coefficients during video coding. The method may provide conditional skipping using a dynamic threshold, picture level quantization table scaling, extreme macroblock (MB) detection and MB adjustment, using either quantization scale adjustment or truncation of Discrete Cosine Transform (DCT) coefficients. In another exemplary embodiment, a system may be provided comprising a programmed data processor and means, such as executable code, for performing quantization as described herein.

In one exemplary embodiment, dynamic threshold-based skipping utilizes the fact that the majority of DCT coefficient values are small and would be quantized to zero. In another exemplary embodiment, the method compares the absolute value of a DCT coefficient to a threshold. In another exemplary embodiment, if the absolute value of the DCT coefficient is smaller than the threshold, then the quantization of the DCT value is skipped. In another exemplary embodiment, the method may include an equation that can be utilized for computing the threshold for each MB.

Another exemplary embodiment provides a method of performing rapid quantization of DCT coefficients during video coding, comprising: (a) executing an off-line training process in which extreme macroblocks (MBs) are differentiated from normal MBs in response to a prediction cost comparison; (b)

performing a real-time control process configured for quantization of DCT coefficients for both normal MBs and extreme MBs; (c) generating a set of scaled quantization tables at the beginning of encoding each picture; and (d) skipping quantization for any DCT coefficients which are expected to zero-out as determined in response to a dynamic skipping threshold.

Another exemplary embodiment provides a method to detect an extreme MB, specifically the MB being encoding when the threshold is exceeded. Additional exemplary embodiments may provide two methods to adjust the MB to make it satisfy the constraints. In one exemplary embodiment, an extreme MB detection method may comprise an off-line training process and a real-time control process. The off-line training process according to this embodiment may determine a threshold as a prediction cost for every coding scheme, every prediction scheme and every value of quantization scale. The thresholds are stored in a table. The real-time control process according to this embodiment may comprise recording the prediction cost for a current MB, deciding the quantization scale (QP) and loading corresponding thresholds Threshold[QP] from the threshold table, comparing the prediction cost for the current MB and deciding the current MB as extreme MB if the prediction cost is greater than the threshold.

Another exemplary embodiment provides a MB adjustment method that utilizes quantization scale adjustment increases, preferably by one, the current value for the extreme MB to a new value and compares the prediction cost with the threshold Threshold[Qnew]. If the prediction cost in this embodiment is smaller than the Threshold[Qnew], then the next MB is encoded. Otherwise the process is repeated until the value of Qnew reaches a threshold, such as eleven for the implementation described.

Another exemplary embodiment provides a MB adjustment method may use truncation on the DCT coefficients to compute the quantization difference DQ between the original Q and the adjusted quantization scale value determined by the MB adjustment method using quantization scale adjustment. In this embodiment, the DC coefficients of the current MB are quantized using the original quantization mechanisms, while the AC coefficients are rounded if the coefficient value is found to be smaller than a threshold which depends on the position of the AC coefficient and the DQ.

Another exemplary embodiment can be generally described as a method of performing rapid quantization of DCT coefficients during video coding, comprising: (a) executing an off-line training process configured for, (i) performing a prediction cost comparison, (ii) differentiating extreme MBs from normal MBs in response to at least one threshold array for the prediction cost comparison, and (iii) adaptation of quantization scale for extreme MBs; and (b) performing a real-time control process configured for quantization of DCT coefficients for both normal MBs and extreme MBs.

Another exemplary embodiment provides a method of performing rapid quantization of DCT coefficients during video coding, comprising: (a) determining a threshold value based on a quantization shift value divided by a multiplication factor table which will return different values based on quantization parameter and position; and (b) dynamic skipping of a quantization process for any DCT coefficients which are expected to zero-out based on the obtained threshold values. During this process, the quantization is executed only for DCT coefficients of sufficient size to perform dynamic threshold-based conditional skipping, the smaller coefficients having fallen below the threshold.

Another exemplary embodiment may provide a method of performing rapid quantization of DCT coefficients during video coding, comprising: (a) executing a weighted quantization; and (b) generating a set of scaled quantization tables in the beginning of encoding each picture. During the above process the quantization scale of each DCT coefficient need not be scaled with a different value in response to position.

Another exemplary embodiment is an apparatus for performing rapid quantization of DCT coefficients during video coding, comprising: (a) a quantization table generation module configured for generating a set of scaled quantization tables at the beginning of encoding each picture; (b) an extreme macroblock (MB) detection module configured for differentiating between a normal MB and an extreme MB; and (c) a quantization scale adaptation module configured for adjusting the quantization table in response to the differentiation between a normal and an extreme MB. It will be appreciated that the present invention can be implemented in hardware, firmware, software, or combinations thereof. Programming configured for executing aspects of the invention may be distributed as executable instructions on fixed media, or by downloading, and other relevant distribution mechanisms without departing from the teachings of the present invention.

An aspect of the invention is to increase the efficiency by which quantization is performed on blocks of transformed coefficients.

Another aspect of the invention is to increase quantization efficiency by generated a set of quantization tables prior to the encoding of each picture.

Another aspect of the invention is the determination of a set of threshold tables for use in extreme MB detection.

Another aspect of the invention is to perform extreme MB detection in response to a cost comparison, such as motion prediction cost.

Another aspect of the invention is to increase quantization efficiency by utilizing a scaled quantization table selection method.

Another aspect of the invention is increase quantization efficiency by using a quantization skipping method, wherein quantization is skipped if the resultant value would be zero, or sufficiently close thereof to be negligible for the given application.

Another aspect of the invention is the generation of multiple scaled quantization tables for each type of picture.

Another aspect of the invention is to modify the threshold in response to a combination of motion estimation cost and QP value.

Another aspect of the invention is the utilization of a training process for generating threshold tables.

Another aspect of the invention is the determination of extreme MB in response to comparison of motion estimation (ME) cost and the threshold table.

Another aspect of the invention is the adjustment of the MB by adjusting the QP value.

Another aspect of the invention is performing an MB adjustment in response to adaptively truncating DCT coefficients.

Another aspect of the invention is the selection of the scaled quantization tables based on MB type and QP value, as described in the context.

Another aspect of the invention is obtaining a dynamic skipping threshold to determine which DCT coefficient values will quantize to zero.

A still further aspect of the invention is utilizing various combinations of conditional skipping, picture level scaling, and extreme MB detection to provide beneficial MPEG-4/AVC quantization.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 2 is a chart of four threshold arrays utilized in an implementation of the quantization method according to an aspect of the present invention.

DETAILED DESCRIPTION OF THE INVENTION

Figure 1:
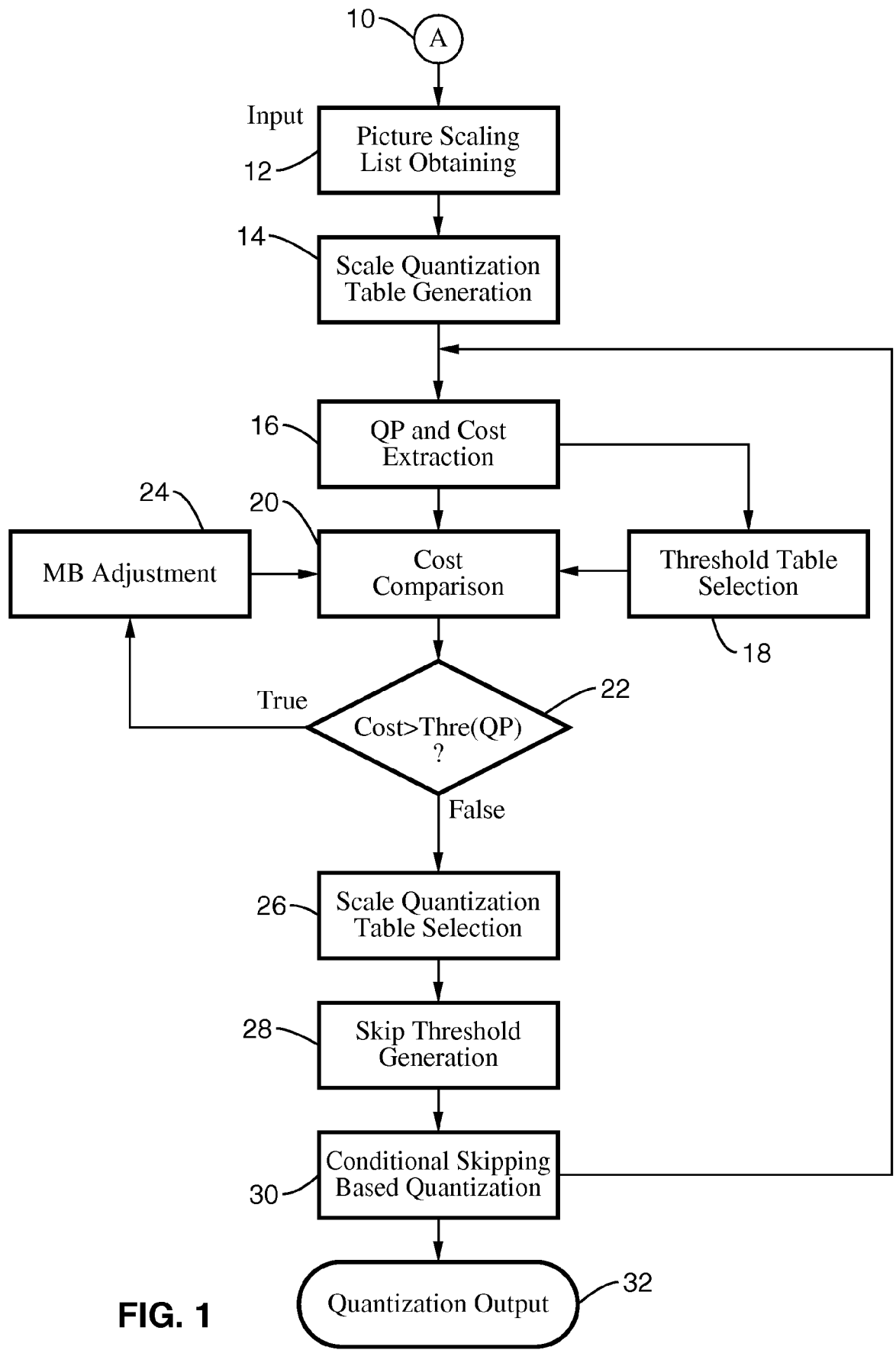
FIG. 1 is a flow diagram of a quantization method according to an embodiment of the present invention.

As an aid to understanding the present invention, the following definitions of terms and abbreviations utilized herein are provided. It will be appreciated, however, that these definitions are only provided for convenience of the reader, and are not a substitute for definitions, terms or abbreviations used by those skilled in the art or intended to be limiting in any manner.

Advanced Video Coding (AVC) is a digital video codec standard which is noted for achieving very high data compression.

Discrete Cosine Transform (DCT) is a Fourier-related transform similar to the discrete Fourier transform (DFT), but using only real numbers.

DC coefficient is the lowest DCT coefficient, and is treated differently from the remaining coefficients, which are referred to as AC coefficients. The DC coefficient corresponds to the average intensity of the component block.

AC coefficients are time-variant DCT coefficients.

Quantization difference (DQ) is the difference between the original value of QP and the adjusted quantization parameter value.

Macroblock (MB) is a regular sized pixel group with 16×16 pixels, utilized for computing motion vectors.

Quantization Parameter (QP) is a parameter utilized to specify the quantization step size.

By way of example, and not of limitation, the present invention reduces AVC encoding quantization complexity by utilizing a fast quantization scheme. Several optimization mechanisms are described that can be integrated to further increase available benefits. These mechanisms include a dynamic threshold-based conditional skipping algorithm to avoid the unnecessary computation on small coefficients, extreme MB detection and quantization scheme to guarantee the bit rate constraint, and a picture level scaling algorithm to perform efficient weighting process. Simulations have demonstrated that considerable calculations are saved with no adverse quality impact.

1. Dynamic Threshold-Based Conditional Skipping

Normally, the encoder first applies the DCT transform to the 4×4 or 8×8 residue block. Then, the same quantization procedure (multiplication, shifting, conditional branch and summation) is applied to each DCT coefficient irrespective of the coefficient value. Statistically, it is known that most of the DCT coefficient values will be quite small, whereupon quantization they will be equal to zero, or sufficiently close to zero to be insignificant for the given application.

According to an aspect of the inventive method described herein, if it is known that the DCT coefficient is sufficiently small, then the regular quantization procedure is skipped. In an exemplary embodiment, a threshold value is determined such that, if the coefficient $C_{ij}$ is less than the threshold $Z_{ij}$, the result will definitely be equal to zero. In this embodiment, threshold values are computed based on a quantization shift value divided by a multiplication factor table which will return different values based on quantization parameter and position. Motivated by this observation, the following equation is used to calculate the threshold:

$$\text{Threshold\_skip} = \text{round}\left(\frac{2^{quant\_shift} - f}{\text{Max}(MF[qp\ \%6][i][j])}\right) \quad (3)$$

Since QP is unchanged within one MB, if f is a constant, there is only one threshold for each MB. When the adaptive deadzone technique is utilized, the value of f is actually dependent on the coefficient positions. Hence, the above equation changes to:

$$\text{Threshold\_skip} = \text{round}\left(\frac{2^{quant\_shift} - \text{Max}(f_{ij})}{\text{Max}(MF[qp\ \%6][i][j])}\right) \quad (4)$$

Before the quantization of one MB, the above equations are used to obtain the threshold. Then, the absolute value of the coefficient is compared to the threshold. If the absolute value of the coefficient is smaller than the threshold, then the quantization output result is directly set to zero. In this way, the computation of quantizing one coefficient is reduced from one multiplication, three summations, one shifting, one table checking, one condition checking to only one condition checking operation without any quality degradation.

2. Picture Level Quantization Table Scaling

During the development of the AVC standard, several technologies were added to the MPEG standard which reflect human visual system perception with regard to high resolution pictures. The combination of these technologies is referred to as AVC FRExtension (Fidelity Range Extensions). In the AVC FRExtension, a weighted quantization mechanism is supported, in which the quantization scale of each DCT coefficient has to be scaled with a different value corresponding to the positions as has been shown above. Because the scaling process includes a division, its complexity is very high. This aspect of the invention accordingly provides a mechanism by which this complexity is reduced.

Since only one quantization table is allowed for each picture in the standard, a set of new scaled quantization tables can be generated. Instead of transmitting the quantization table MF[qp % 6][i][j] and scaling table Scale[i][j] and calculating the quantization parameter on-the-fly, a new table can be generated as:

$$\text{Scale\_Q}[qp\ \%6][i][j] = \text{round}\left(\frac{16 \cdot MF[qp\ \%6][i][j]}{\text{Scale}[i][j]}\right) \quad (5)$$

which is transmitted to the quantization process. Because the calculation is conducted in the picture level, the complexity increase as a result of scaling is essentially negligible.

Based on these concepts, an embodiment of a picture level quantization scaling scheme according to the present invention comprises the following steps:

(a) Define the data structure and initialize the memory allocation as Scale_Q4×4[6][6][16] and Scale_Q8×8[6][2][64] in the beginning of the encoding process.

(b) Obtain the picture level scaling list according to the standard table (table 7-2 of the AVC standards document, document number JVT-N050d1) in the beginning of encoding one picture.

(c) Obtain the scaled quantization table Scale_Q4×4 and Scale_Q8×8 according to Equ. 5, wherein the first index corresponds to the value of qp % 6 and the second index corresponds to the value of scaling list index as in standard table 7-2 of the AVC standards document.

(d) Using rate control to obtain the quantization step M_qp for the current MB and to calculate the value of M_qp % 6, determine the second table index as index_type according to the MB type and block size.

(e) Transmit the selected one dimensional quantization table as Scale_Q[M_qp % 6][index_type] to the quantization module and calculate the quantized coefficient as $$Z_{ij} = \text{round}\left(\frac{C_{ij} \cdot \text{Scale\_Q}[i][j] + f}{2^{quant\_shift}}\right)$$

Note that Scale_Q[i][j] indicates putting a one dimensional array into a two-dimensional order. Scale_Q is still a one dimensional array.

(f) Repeat steps (d) and (e) until the end of picture.

3. Extreme MB Detection And Quantization Adaptation

As mentioned in the previous section, in order to satisfy the constraint in the AVC standard Annex A3.1(n), multiple pass encoding/decoding may be required, although the complexity of performing multiple pass encoding/decoding is typically too high. Multiple passes can be eliminated by utilizing bit rate estimation schemes, wherein based on the bit estimation result, the adjustments can be made to satisfy the constraint. The constraint is satisfied at the expense of increasing complexity of bit rate estimation, while inducing a level of quality loss. However, the following three problems exist with such conventional bit rate estimation techniques:

(a) Complexity: conventional techniques are binarization based coefficient bit rate estimation methods, which increase the complexity of quantization by at least +20%.

(b) Overly aggressive: In order to guarantee the fail safe criterion, conventional techniques usually utilize very aggressive estimation which always overestimate the MB bit rate.

(c) Conventional bit rate estimation is only a rough estimation based on CAVLC (for Context-Adaptive Variable-Length Coding). There is not an effective bit rate estimation method for CABAC (for Context-Adaptive Binary Arithmetic Coding).

Accordingly, various aspects of the invention which address those problems recognize that:

(a) Accurate bit rate estimation cannot be obtained by using the strategy with significantly less complexity than the arithmetic coding (CAVLC, CABAC); and (b) The constraint conformance check needs not rely on accurate bit rate estimation, as this can be performed using a low-complexity dynamic range check.

4. Extreme MB Detection and Quantization Scale Adjustment

According to the AVC standard, the constraint value is 3200 bits. A typical SD (standard definition) sized frame (720×480) contains 1350 MBs. If each MB uses 3200 bits, then a 30 frame/sec SD sequence will use 129.6 Mbps. It is known that AVC can provide beneficial visual quality with less than 6 Mbps when encoding a very difficult sequence. The 6 Mbps rate for AVC works to less than an average of 160 bits for each macroblock. If one MB requires more than 3200 bits, then it clearly has a very bad prediction with an extremely small quantization scale.

Based on this observation, the bit rate conditions have been investigated for many benchmark sequences with various quantization scales. According to these investigations, it was found that no MB uses more than 3200 bits when the quantization scale is larger than eleven for both CABAC and CAVLC coding. From the rate distortion theory, it is known that the larger the prediction variance (high entropy), the higher the bit rate will be using the same quantization scale. In conventional video coding schemes, either SAD or SATD is utilized. The term SAD is an acronym for "Sum of Absolute Difference", while the term SATD is an acronym for "Sum of Absolute Transformed Difference". Although an entirely accurate model of Rate (SAD/QP or SATD/QP) has not been found yet (e.g., it may not exist for a real life sequence), it is reasonable to believe that certain SAD or SATD values will lead to a bit rate in a specified range for a given quantization and coding scheme. For instance, if QP>11, Rate (SAD/QP or SATD/QP)<3200 for any prediction condition; if SATD<3000, Rate (SATD/QP)<3200 for any quantization scale. Similarly, for a given bit rate constraint and SAD/SATD condition the lower bound of the quantization scale can be estimated such that the constraint will be conformed.

In response to investigations of the preceding considerations, an aspect of the present invention is an extreme MB detection and quantization scale adjustment method. In an exemplary embodiment, the method comprises an off-line training process and a real time control process. An embodiment of the off-line training process comprises the following steps:

(a) Encode video sequence and record the prediction cost (SAD/SATD+Lamda*R(MV)) of current MB.

(b) Use fixed quantization scale QP on each MB (let QP=0 for the first round).

(c) If the number of bits utilized by the current MB is larger than the constraint (extreme MB), then go to step (d); otherwise (normal MB) start to encode next MB.

(d) If the current MB is the first MB with overflow bit rate, record the prediction cost as Threshold[QP];

(e) If the current MB is not the first MB with overflow bit rate, compare the current prediction cost with the Threshold[QP] and update the Threshold[QP] with the smaller one.

(f) Repeat steps (b) through step (e) for all of the MBs and determine the final Threshold[QP] for the current sequence.

(g) Increment the quantization scale (e.g., by 1) and repeat steps (b) through (f) until QP is equal to a desired limit, (e.g., 11).

(h) Apply steps (a) through (g) to all the benchmark sequences and update all of the Threshold[QP]s with the smaller ones.

(i) Change the coding scheme (CABAC or CAVLC) and prediction scheme (SAD or SATD) and repeat steps (a) through (h) to generate the other threshold arrays.

4.1 Quantization Adjustment Based Method

In an embodiment of the invention, by combining various coding and prediction schemes, four threshold arrays can be obtained once the off-line training process is completed. In case of omitting some extreme MB, the value in the threshold array is adjusted to 80% of the trained value. In doing so, the risk of encountering unexpected MBs with smaller prediction cost and large encoding bit rate is prevented. The obtained threshold arrays are embedded into the encoder.

In an exemplary embodiment, the real time control process is conducted by adaptively selecting a threshold array based on the actual coding conditions and comprises the following steps:

(a) Encode video sequence and record the prediction cost (SAD/SATD+Lamda*R(MV)) of current MB.

(b) Decide quantization scale QP on current MB. If QP>11, start to encode next MB. Otherwise check the table to obtain Threshold[QP].

(c) If the prediction cost of current MB is larger than, or equal to, Threshold[QP], then go to step (d). Otherwise start to encode the next MB.

(d) Increase the value of QP by one. If QP>11, start to encode next MB. Otherwise, check the table to obtain Threshold[QP] and go to step (c).

(e) Repeat steps (a) through (d) to all of the MBs for the whole sequence.

4.2 Truncation Based Method

In the above strategy, it is assumed the MB quantization scale can be adjusted MB by MB. In an exemplary embodiment, the method realizes MB rate constraint conformance if it is preferred that the quantization scale remain unchanged by performing the steps comprising:

(a) Use the method in section 4.1 to obtain the quantization difference (DQ) between the original quantization scale and the adjustment.

(b) Once starting to quantize the MB the original quantization method is applied to all the DC coefficients.

(c) Change the rounding term to half of the original for the first two AC coefficients according to scanning order.

(d) Change the rounding term to zero and let the quantization result be equal to zero if the coefficient is less than $2^{(DQ+1)}$ for the next three AC coefficients according to scanning order.

(e) Change the rounding term to zero and let the quantization result be equal to zero if the coefficient is less than $2^{(DQ+2)}$ for the next four AC coefficients according to scanning order.

(f) Change the rounding term to zero and let the quantization result be equal to zero if the coefficient is less than $2^{(DQ+3)}$ for all the remaining AC coefficients according to scanning order.

According to an aspect of the invention, the complexity increase is negligible and in most cases there is only one condition check for each MB. In actuality, in the test performed, it was not possible to even detect any complexity increase when using Intel-Vtune. Since the invention works on the MB level instead of 4×4 block level, the problem of over-aggressive and unfair truncation problems has thus been solved.

Based on the training results four threshold arrays have been obtained as represented in FIG. 2. Initial test results have demonstrated the MB rate constraint conformance is satisfied.

5. A Unified MPEG-4/AVC Quantization Scheme

Thus far, picture level scaling and extreme MB detection have been described for rapid quantization based on conditional skipping. By utilizing these aspects of the invention in combination, a unified MPEG-4/AVC quantization scheme is provided.

FIG. 1 illustrates an embodiment of such a unified MPEG-4/AVC quantization method that utilizes a combination of conditional skipping, picture level scaling, and extreme MB detection. Referring to FIG. 1, the method starts at block 10, and the scaling list is first obtained as represented by block 12 in the beginning of encoding one picture. Then, at block 14 a set of scaled quantization tables is generated according to the inventive methods.

During the MB encoding process, the motion prediction cost and its type is obtained from the motion estimation module and the quantization step QP is obtained from the rate control module as per block 16. Based on the arithmetic coding type (CAVLC or CABAC) and cost type (SAD or SATD), the threshold table for extreme MB detection is selected as per block 18, and the cost comparison is setup as per block 20. The cost is then compared in block 22 with the threshold value corresponding to the current QP.

If the cost exceeds the threshold (expression evaluates to TRUE), then the current MB is detected as an extreme MB (no longer considered a 'normal' MB) with very high possibility to generate more bits than the constraint. Thus, the MB adjustment module of block 24 is called, wherein either a quantization adjustment based method or a coefficient truncation based method is executed. The MB with the adjustment is then sent to the cost comparison module 20.

According to the MB type (Intra or Inter), luminance or chrominance, and transform type (8×8 or 4×4), the specified scaled quantization table is selected from the set of tables generated in the picture level as per block 26. The skipping threshold is also generated in block 28 according to the method described in the contents. It is noted that the skipping threshold is calculated by:

$$\text{Threshold\_skip} = \text{round}\left(\frac{2^{quant\_shift} - \text{Max}(f_{ij})}{\text{Max}(\text{Scale\_Q}[i][j])}\right)$$

The selected table and skipping threshold are then sent to the blocking quantization process. The dynamic threshold-based conditional skipping scheme is applied at block 30 to conduct the quantization for each DCT coefficient, with a quantization output 32.

6. Block Diagram of MPEG-4/AVC Quantization Scheme

Figure 3:
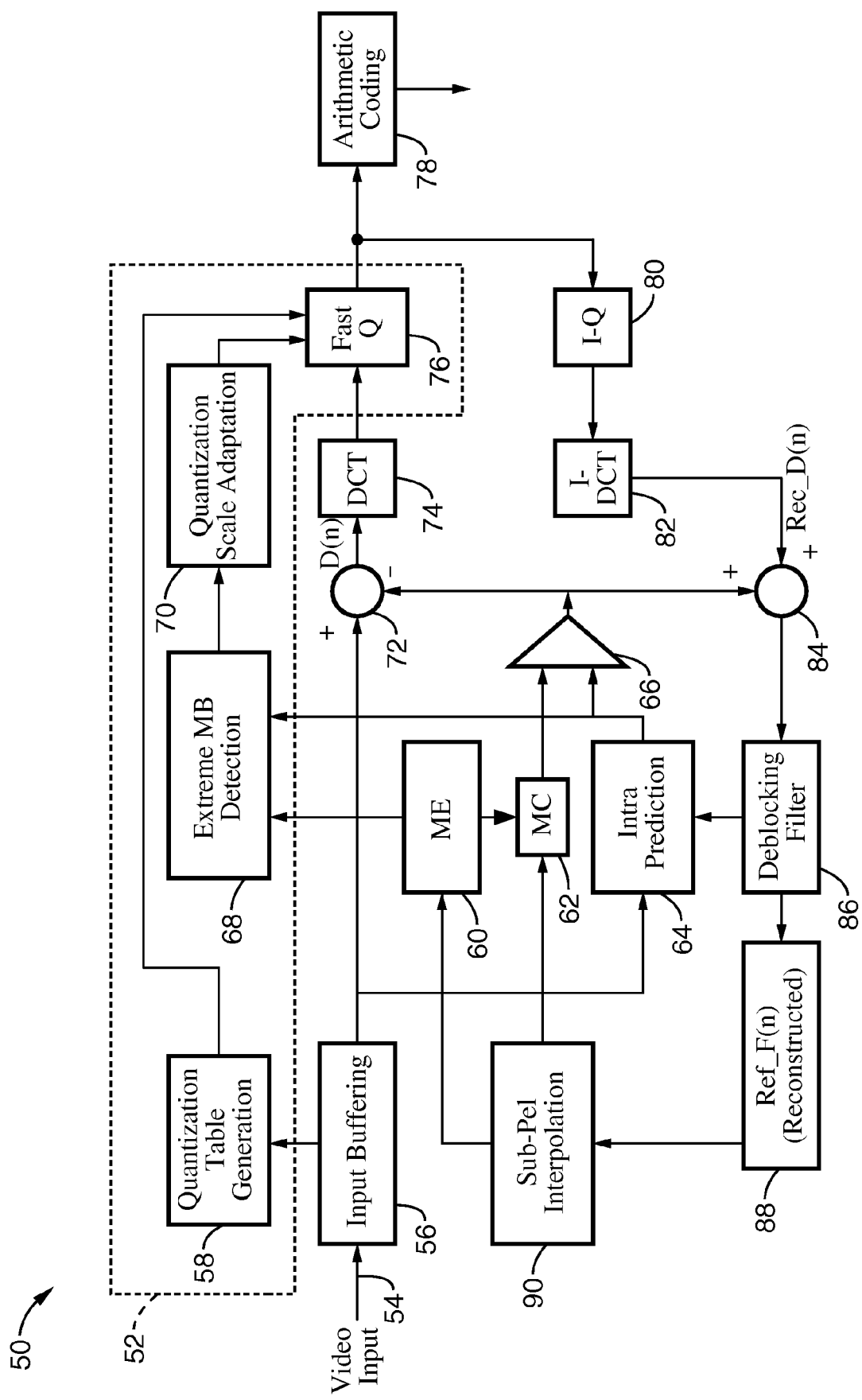
FIG. 3 is a block diagram of a fast quantization structure according to an embodiment of the present invention.

FIG. 3 illustrates a functional block diagram of an embodiment 50 of the fast quantization scheme in MPEG4/AVC encoder according to the present invention. Outlined in dashed region 52 are elements which generally differentiate the embodiments of the present invention from prior encoding mechanisms.

The video input 54 is buffered within input buffer 56 from which it is processed frame by frame. Before the encoding of each frame, a set of weighted quantization tables are generated in the quantization table generation module 58. Once an input F(n) is presented for encoding, it is processed in units of a macroblock. Each macroblock is received at motion estimation block 60 with associated motion compensation block 62. During motion estimation, a search is performed for motion on the input macroblock to determine the INTER coding mode (e.g., seven different partitions, skip mode and bi-directional mode if input is B frame) and reference prediction (e.g., number of reference frame and its resolution, such as integer-pel, half-pel and quarter-pel).

A conditional intra-prediction is then performed by intra-prediction block 64 to find the best INTRA mode. The cost of INTER and INTRA is compared at comparator block 66, wherein the mode with the smaller cost is selected. This cost is received by extreme MB detection block 68 to determine if the current MB has the potential to use more bits than the standard allowed. According to the detection result of the extreme MB detection block 68, the quantization scale is adjusted at block 70 to avoid the risk of bit overflow.

At the same time, a prediction macroblock is formed based on the selected mode and sent out. The prediction macroblock is subtracted by adder block 72 from the current macroblock to produce a residual macroblock D(n). D(n) is transformed by DCT block 74 and sent to the fast quantization block 76. Output from the fast quantization module is received by arithmetic coding block 78. In quantization block 76, the early skipping based method of the present invention is utilized to generate a set of quantized transform coefficients. These coefficients are re-ordered and entropy coded. Simultaneously, inversed quantization at I-Q block 80 and inverse transform at I-DCT block 82 are applied to the quantized transform coefficients to generate a reconstructed macroblock Rec_D(n). Rec_D(n) is combined at adder block 84 with the prediction macroblock to generate a reconstructed macroblock. When all the macroblocks in the current frame are encoded and reconstructed, deblocking filter 86 is applied to the reconstructed frame to generate the reconstructed integer reference frame Ref_F(n) at block 88. After that, the sub-pel reference frames are obtained by applying interpolation filter at block 90 on Ref_F(n).

The present invention can be implemented within an electronic apparatus or system, as represented by the block diagram of FIG. 3. By way of example, and not limitation, the present invention can be implemented as a circuit, or within a video processing chip, such as comprising an integrated circuit, custom/semi-custom ASIC, or similar. The video processing chip can be further used as a central processing unit to form a video sub-system within an electronic device, such as within a smart cell phone, video camcorder, digital camera, personal digital assistance, high definition television (HDTV), or similar video capture and processing apparatus and systems.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of performing rapid quantization of discrete cosine transform (DCT) coefficients during picture encoding in a video stream, comprising:

performing an off-line training process in which extreme video macroblocks (MBs) are differentiated from normal video MBs based on a prediction cost comparison, with prediction costs recorded as a quantization parameter (QP) threshold, and the off-line training process resulting in determining a final quantization parameter (QP) threshold;

wherein video macroblocks are considered to be extreme video macroblocks (MBs) if their cost exceeds a given cost threshold;

performing a real-time control process wherein DCT coefficients are quantized for both normal video MBs and extreme video MBs, including an adaptation of quantization scale, or coefficient truncation, for extreme MBs;

generating a set of scaled DCT coefficient quantization tables at the beginning of encoding each picture; and skipping quantization for any DCT coefficients which are expected to zero-out based on a dynamic skipping threshold.

2. An apparatus for performing rapid quantization of discrete cosine transform (DCT) coefficients during picture encoding in a video stream, comprising:

means for performing an off-line training process wherein extreme video macroblocks (MBs) are differentiated from normal video MBs based on a prediction cost comparison, with prediction costs recorded as a quantization parameter (QP) threshold, and the off-line training process resulting in determining a final quantization parameter (QP) threshold;

wherein video macroblocks are considered to be extreme video macroblocks if their cost exceeds a given cost threshold;

means for performing a real-time control process wherein DCT coefficients are quantized for both normal video MBs and extreme video MBs, including an adaptation of quantization scale or coefficient truncation, for extreme MBs;

means for generating a set of scaled DCT coefficient quantization tables at the beginning of encoding each picture; and means for skipping quantization for any DCT coefficients which are expected to zero-out based on a dynamic skipping threshold.

3. A method of performing rapid quantization of DCT coefficients during video coding, comprising:

(a) performing a prediction cost comparison for video macroblocks (MB) in a video stream;

wherein video macroblocks are considered to be extreme video macroblocks if their cost exceeds a given cost threshold;

(b) differentiating extreme video macroblocks from normal video MBs based on a threshold array for said prediction cost comparison;

(c) adapting a quantization scale for extreme video MBs; and (d) quantizing discrete cosine transformation (DCT) coefficients for both normal video MBs and extreme video MBs.

4. A method as recited in claim 3, wherein quantizing DCT coefficients is performed utilizing Context-Adaptive Binary Arithmetic Coding (CABAC) or Context-Adaptive Variable-Length-Coding (CAVLC) coding schemes.

5. A method as recited in claim 3, wherein said prediction cost comparison comprises Sum of Absolute Difference (SAD) or Sum of Absolute Transformation Difference (SATD) comparison.

6. A method as recited in claim 3:
wherein said prediction cost comparison comprises encoding a video sequence while recording prediction cost; and
wherein prediction cost is determined as (SAD/SATD+ Lamda*R(MV)) of current MB.

7. A method as recited in claim 3, wherein said quantization scale is either adapted MB by MB or by truncation to realize conformance of MB rate constraint.

8. A method as recited in claim 3, wherein an extreme MB is determined based on the comparison of motion estimation cost and the threshold array.

9. A method as recited in claim 3, further comprising adjusting MBs in response to adjusting the QP value.

10. A method as recited in claim 3, further comprising adjusting MBs in response to adaptively truncating the DCT coefficients.

11. A method as recited in claim 3, further comprising:
generating a set of scaled quantization tables at the beginning of encoding of each picture;
wherein the quantization scale of each DCT coefficient need not be scaled with a different value in response to position.

12. A method as recited in claim 3, further comprising:
obtaining a threshold value based on a quantization shift value divided by a multiplication factor table which will return different values based on quantization parameter and position; and
dynamically skipping a quantization process for any DCT coefficients which are expected to zero-out based on the obtained threshold values.

13. An apparatus for performing rapid quantization of DCT coefficients during video coding, comprising:
(a) means for performing a prediction cost comparison for video macroblocks (MB) in a video stream;
wherein video macroblocks are considered to be extreme video macroblocks if their cost exceeds a given cost threshold;
(b) means for differentiating extreme video macroblocks from normal video MBs based on a threshold array for said prediction cost comparison;
(c) means for adapting a quantization scale for extreme video MBs; and
(d) means for quantizing discrete cosine transformation (DCT) coefficients for both normal video MBs and extreme video MBs.

14. An apparatus as recited in claim 13, wherein quantizing DCT coefficients is performed utilizing Context-Adaptive Binary Arithmetic Coding (CABAC) or Context-Adaptive Variable-Length-Coding (CAVLC) coding schemes.

15. An apparatus as recited in claim 13, wherein said prediction cost comparison comprises Sum of Absolute Difference (SAD) or Sum of Absolute Transformation Different (SATD) comparison.

16. An apparatus as recited in claim 13:
wherein said prediction cost comparison comprises encoding a video sequence while recording prediction cost; and
wherein prediction cost is determined as (SAD/SATD+ Lamda*R(MV)) of current MB.

17. An apparatus as recited in claim 13, wherein said quantization scale is either adapted MB by MB or by truncation to realize conformance of MB rate constraint.

18. An apparatus as recited in claim 13, wherein an extreme MB is determined based on the comparison of motion estimation cost and the threshold array.

19. An apparatus as recited in claim 13, further comprising means for adjusting MBs in response to adjusting the QP value.

20. An apparatus as recited in claim 13, further comprising means for adjusting MBs in response to adaptively truncating the DCT coefficients.

21. An apparatus as recited in claim 13, further comprising:
means for generating a set of scaled quantization tables at the beginning of encoding of each picture;
wherein the quantization scale of each DCT coefficient need not be scaled with a different value in response to position.

22. An apparatus as recited in claim 13, further comprising:
means for obtaining a threshold value based on a quantization shift value divided by a multiplication factor table which will return different values based on quantization parameter and position; and
means for dynamically skipping a quantization process for any DCT coefficients which are expected to zero-out based on the obtained threshold values.

23. A method of performing rapid quantization of DCT coefficients during video coding, comprising:
determining a threshold value based on a quantization shift value divided by a multiplication factor table which will return different values based on quantization parameter and position; and
dynamically skipping a quantization process for any DCT coefficients which are expected to zero-out based on the obtained threshold values;
wherein quantization is executed only for DCT coefficients of sufficient size to perform dynamic threshold-based conditional skipping.

24. A method as recited in claim 23, wherein the skipping threshold is determined by using a dynamic threshold for determining whether to skip quantization on select DCT coefficients.

25. A method as recited in claim 23, wherein said threshold value is determined according to:

$$\text{Threshold\_skip} = \text{round}\left(\frac{2^{quant\_shift} - f}{\text{Max}(MF[qp\ \%6][i][j])}\right)$$

wherein MF is a multiplication factor table which returns different values based on the value of qp and position i and j, qp is quantization parameter, and f is quantization offset.

26. A method as recited in claim 23, further comprising:
(a) performing a prediction cost comparison;
(b) differentiating extreme macroblocks (MBs) from normal MBs in response to at least one threshold array for said prediction cost comparison;
wherein macroblocks are considered to be extreme macroblocks if their cost exceeds a cost threshold;
(c) adapting a quantization scale for extreme MBs; and
(d) performing a real-time control process, said real-time control process providing quantization of discrete cosine transform (DCT) coefficients for both normal MBs and extreme MBs.

27. A method as recited in claim 23, further comprising:
generating a set of scaled quantization tables in the beginning of encoding of each picture;
wherein the quantization scale of each DCT coefficient need not be scaled with a different value in response to position.

28. An apparatus for performing rapid quantization of DCT coefficients during video coding, comprising:

means for determining a threshold value based on a quantization shift value divided by a multiplication factor table which will return different values based on quantization parameter and position; and means for dynamically skipping a quantization process for any DCT coefficients which are expected to zero-out based on the obtained threshold values;

wherein quantization is executed only for DCT coefficients of sufficient size to perform dynamic threshold-based conditional skipping.

29. An apparatus as recited in claim 28, wherein the skipping threshold is determined by using a dynamic threshold for determining whether to skip quantization on select DCT coefficients.

30. An apparatus as recited in claim 28, wherein said threshold value is determined according to:

$$\text{Threshold\_skip} = \text{round}\left(\frac{2^{quant\_shift} - f}{\text{Max}(MF[qp \ \%6][i][j])}\right)$$

wherein MF is a multiplication factor table which returns different values based on the value of qp and position i and j, qp is quantization parameter, and f is quantization offset.

31. An apparatus as recited in claim 28, further comprising:
(a) means for performing a prediction cost comparison;
(b) means for differentiating extreme macroblocks (MBs) from normal MBs in response to at least one threshold array for said prediction cost comparison;
wherein macroblocks are considered to be extreme macroblocks if their cost exceeds a given cost threshold;
(c) means for adapting a quantization scale for extreme MBs; and
(d) means for performing a real-time control process, said real-time control process providing quantization of discrete cosine transform (DCT) coefficients for both normal MBs and extreme MBs.

32. An apparatus as recited in claim 28, further comprising:
means for generating a set of scaled quantization tables in the beginning of encoding of each picture; wherein the quantization scale of each DCT coefficient need not be scaled with a different value in response to position.

33. A method of performing rapid quantization of DCT coefficients during video coding, comprising:
executing a weighted quantization; and
generating a set of scaled quantization tables in the beginning of encoding of each picture;
each DCT coefficient having a quantization scale;
wherein the quantization scale of each DCT coefficient need not be scaled with a different value in response to position.

34. A method as recited in claim 33, wherein six scaled quantization tables are generated for each type of picture.

35. A method as recited in claim 33, further comprising selecting a scaled quantization table based on the MB type and QP value described in context.

36. A method as recited in claim 33, wherein a new quantization scaling is generated according to the equation:

$$\text{Scale\_Q}[qp \ \%6][i][j] = \text{round}\left(\frac{16 \cdot MF[qp \ \%6][i][j]}{\text{Scale}[i][j]}\right)$$

wherein MF is a multiplication factor table which returns different values based on the value of qp and position i and j, qp is quantization parameter, and f is quantization offset; and wherein rate control is utilized for obtaining a quantization step M_qp for the current MB and calculating a value of M_qp % 6.

37. An apparatus for performing rapid quantization of DCT coefficients during video coding, comprising:
means for executing a weighted quantization; and
means for generating a set of scaled quantization tables in the beginning of encoding of each picture;
each DCT coefficient having a quantization scale;
wherein the quantization scale of each DCT coefficient need not be scaled with a different value in response to position.

38. An apparatus as recited in claim 37, wherein six scaled quantization tables are generated for each type of picture.

39. An apparatus as recited in claim 37, further comprising means for selecting a scaled quantization table based on the MB type and QP value described in context.

40. An apparatus as recited in claim 37, wherein a new quantization scaling is generated according to the equation:

$$\text{Scale\_Q}[qp \ \%6][i][j] = \text{round}\left(\frac{16 \cdot MF[qp \ \%6][i][j]}{\text{Scale}[i][j]}\right)$$

wherein MF is a multiplication factor table which returns different values based on the value of qp and position i and j, qp is quantization parameter, and f is quantization offset; and wherein rate control is utilized for obtaining a quantization step M_qp for the current MB and calculating a value of M_qp % 6.

41. A method of performing rapid quantization of DCT coefficients during video coding, comprising:
(a) performing a prediction cost comparison of video macroblocks (MB);
(b) differentiating extreme MBs from normal MBs in response to at least one threshold array for said prediction cost comparison;
wherein video macroblocks are considered to be extreme macroblocks if their cost exceeds a cost threshold;
(c) adapting a quantization scale for extreme MBs;
(d) quantizing DCT coefficients for both normal MBs and extreme MBs;
(e) generating a set of scaled quantization tables in the beginning of encoding of each picture;
(f) wherein the quantization scale of each DCT coefficient need not be scaled with a different value in response to position;
(g) obtaining a threshold value based on a quantization shift value divided by a multiplication factor table which will return different values based on quantization parameter and position; and
(h) dynamically skipping a quantization process for any DCT coefficients which are expected to zero-out based on the obtained threshold values.

42. An apparatus for performing rapid quantization of DCT coefficients during video coding, comprising:
(a) means for performing a prediction cost comparison of video macroblocks (MB);
(b) means for differentiating extreme MBs from normal MBs in response to at least one threshold array for said prediction cost comparison;

wherein video macroblocks are considered to be extreme macroblocks if their cost exceeds a cost threshold;

(c) means for adapting a quantization scale for extreme MBs;

(d) means for quantizing DCT coefficients for both normal MBs and extreme MBs;

(e) means for generating a set of scaled quantization tables in the beginning of encoding of each picture;

(f) wherein the quantization scale of each DCT coefficient need not be scaled with a different value in response to position;

(g) means for obtaining a threshold value based on a quantization shift value divided by a multiplication factor table which will return different values based on quantization parameter and position; and (h) means for dynamically skipping of a quantization process for any DCT coefficients which are expected to zero-out based on the obtained threshold values.

* * * * *